US006925132B2

United States Patent
Song et al.

(10) Patent No.: US 6,925,132 B2
(45) Date of Patent: Aug. 2, 2005

(54) METHOD FOR DETECTING AND CORRECTING AMPLITUDE AND PHASE IMBALANCES BETWEEN I AND Q COMPONENTS IN QUADRATURE DEMODULATOR

(75) Inventors: Yun-Jeong Song, Daejeon (KR); Young-Wan Kim, Daejeon (KR); Nae-Soo Kim, Daejeon (KR); Ho-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 380 days.

(21) Appl. No.: 10/136,307

(22) Filed: May 2, 2002

(65) Prior Publication Data

US 2003/0112898 A1 Jun. 19, 2003

(30) Foreign Application Priority Data

Dec. 14, 2001 (KR) .......................................... 2001-79319

(51) Int. Cl.$^7$ .......................... H04L 27/22; H04L 27/06; H04L 27/14
(52) U.S. Cl. ........................ 375/316; 375/326; 375/329; 375/340
(58) Field of Search ................................. 375/316, 317, 375/261, 279, 280, 340, 326, 324, 345, 329; 329/329

(56) References Cited

U.S. PATENT DOCUMENTS

| | | | | |
|---|---|---|---|---|
| 5,705,949 A | * | 1/1998 | Alelyunas et al. | 329/304 |
| 5,949,821 A | | 9/1999 | Emami et al. | |
| 6,009,317 A | * | 12/1999 | Wynn | 455/296 |
| 6,044,112 A | * | 3/2000 | Koslov | 375/235 |
| 6,122,325 A | | 9/2000 | Mogre et al. | |
| 6,512,800 B1 | * | 1/2003 | Amir et al. | 375/296 |

FOREIGN PATENT DOCUMENTS

| | | | | |
|---|---|---|---|---|
| EP | 001363391 A1 | * | 11/2003 | |
| JP | 06-188938 | | 7/1994 | H04L/29/06 |

* cited by examiner

Primary Examiner—Tesfaldet Bocure
(74) Attorney, Agent, or Firm—Mayer, Brown, Rowe & Maw LLP

(57) ABSTRACT

Disclosed is a method for detecting and correcting amplitude and phase imbalances between in-phase (I) and quadrature-phase (Q) components in a high-speed wireless communication quadrature demodulator, which comprises: a) comparing an input signal with a signal determined by a quadrant to which the input signal belongs, and detecting imbalances between I and Q components with respect to the input signal; and b) using the imbalances detected in a) to correct the input signal. The present invention prevents distorting of the demodulator's performance caused by the imbalances to between I and Q components and increases application to high-speed wireless communication.

5 Claims, 2 Drawing Sheets

← complex number signals

METHOD FOR DETECTING AND CORRECTING AMPLITUDE AND PHASE IMBALANCES BETWEEN I AND Q COMPONENTS IN QUADRATURE DEMODULATOR

BACKGROUND OF THE INVENTION (a) Field of the Invention

The present invention relates to a quadrature demodulator used for a high-speed wireless communication system. More specifically, the present invention relates to a method for detecting and correcting amplitude and phase imbalances between I and Q components of complex signals generated by a quadrature demodulator (b) Description of the Related Art In a high-speed wireless communication system, the demodulator receives signals through an antenna, a radio frequency (RF) unit, and an intermediate frequency (IF) unit. The RF unit and IF unit convert the high frequency to a low frequency and amplifies the signals to generate desired signals.

The RF unit and the IF unit utilize various analog elements including mixers and amplifiers that satisfy specifications within a certain range, but the specifications have some limits, and input signals are distorted by incompleteness of isolation and phase orthogonal properties between the elements.

Distortion factors include amplitude and phase imbalances between in-phase (I) and quadrature-phase (Q) components at the quadrature demodulator, in, e.g., QPSK and/or QAM demodulators. The amplitude and phase imbalances between I-phase and Q-phase components cause degradation of the performance of the demodulator in the modem for recovering signals. Therefore, methods for removing the amplitude and phase imbalances between the I and Q components are required.

Regarding removal of the amplitude and phase imbalances between I and Q components, several methods using an RF direct conversion receiver are disclosed. The U.S. Pat. No. 6,044,112 entitled "Method and apparatus for correcting amplitude and phase imbalances in demodulators" by Joshua L. Koslov dated Mar. 28, 2000 discloses a method for providing several complex adders and multipliers as well as a counter to the demodulator to correct gain and phase imbalances. However, the method by Koslov increases implementation complexity by using complex multipliers and is sensitive to noise because it utilizes a simple counter at the demodulator. Further, since this method sets the amplitude and phase imbalances between I and Q components according to counter step, its response speed depends on the increase and decrease step size of the count. The method does not reflect the actual received signal, but depends on counter step size.

In addition, the U.S. Pat. No. 5,949,821 entitled "Method and apparatus for correcting phase and gain imbalances between in-phase(I) and quadrature (Q) components of a received signal based on a determination of peak amplitudes" by Shahriar Emami discloses a method for detecting amplitude peak values of demodulated I and Q components, and correcting the amplitude and phase imbalances between I and Q components using the peak values. The patent sets one of the I and Q components as a reference component and another one as an imbalance component, finds the amplitude peak value of each component, and finds the phase imbalance using sine functions. It uses arcsine functions to determine the phase imbalances between I and Q components, but this application of the arcsine functions increases digital circuit complexity or degrades the system's performance.

The above-noted patents have failed to solve the problems of circuit implementation complexity and noise sensitivity, so an improved method of detecting and correcting the amplitude and phase imbalances between I and Q components is now required.

SUMMARY OF THE INVENTION

It is an object of the present invention to provide a method for detecting and correcting amplitude and phase imbalances between I and Q components.

In one aspect of the present invention, a method for detecting and correcting amplitude and phase imbalances between in-phase (I) and quadrature (Q) components in a high-speed wireless, communication quadrature demodulator, comprises: a) comparing an input signal with a signal determined by a quadrant to which the input signal belongs, and detecting imbalances between I and Q components with respect to the input signal; and b) using the imbalances detected in a) to correct the input signal.

The step a) comprises: 1) determining a quadrant position of the input signal; 2) using the quadrant position determined in 1) to determine the input signal with respect to respective quadrants; 3) respectively determining the signals determined with respect to respective quadrants in 2); 4) subtracting the determined signals in 3) from the determined signals in 2); and 5) averaging the respective subtracted signals to output the amplitude and phase imbalances between I and Q components.

The step b) comprises: 1) delaying the input signal by one symbol; 2) determining the input signal's quadrant position; 3) determining the amplitude and phase imbalance signals between I and Q components detected with respect to the input signal according to the quadrant position determined in 2); and 4) subtracting the imbalance signals determined in 3) from the input signal delayed in 1) to correct the input signal.

The amplitude and phase imbalance corrector comprises: a signal delay unit for delaying the signal input from the multiplier by one symbol; a quadrant decision unit for determining a position of the quadrant corresponding to the input signal; a multiplexer for comparing the input signal with the signal determined by the quadrant to which the input signal belongs, matching the amplitude and phase imbalance of the detected input signal between I and Q components with the quadrant position determined by the quadrant decision unit, and outputting results; and a subtractor for subtracting the signal output from the multiplexer from the signal output from the signal delay unit, and outputting results.

The amplitude and phase imbalance detector comprises: a quadrant decision unit for receiving an input signal from the carrier phase detector, and outputting the corresponding quadrant position; a demultiplexer for demultiplexing the input signal to be matched with the quadrant position output by the quadrant decision unit; a signal decision unit for outputting a signal determined with respect to the quadrant corresponding to the signal output from the demultiplexer; a subtractor for subtracting the signal output from the signal decision unit from the signal output of the demultiplexer, and outputting results; and a signal averager for averaging the signals output from the subtractor, and in outputting results.

The signal averager is a low pass filter for filtering low frequency ranges of the signal output from the subtractor, and outputting results.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
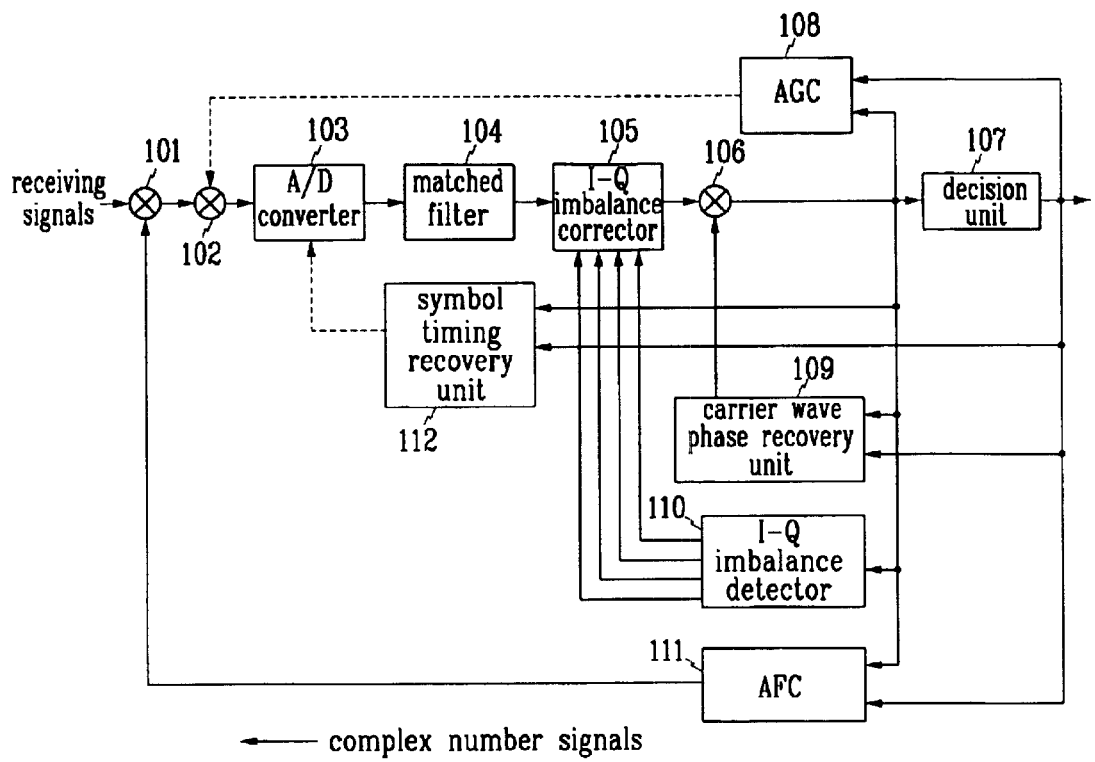
FIG. 1 shows a block diagram of a quadrature demodulation receiver for implementation of detecting and correcting amplitude and phase imbalances between I and Q components according to a preferred embodiment of the present invention.

FIG. 1 shows a block diagram of a quadrature demodulation receiver for implementation of detecting and correcting amplitude and phase imbalances between I and Q components according to a preferred embodiment of the present invention.

As shown, the quadrature demodulation receiver comprises: complex multipliers 101 and 102; an analog-digital (A/D) converter 103; a matched filter 104; an I-Q imbalance corrector 105; a carrier phase detector 106; a decision unit 107; an automatic gain controller (AGC) 108; a carrier phase recovery unit 109; an I-Q imbalance detector 110; an automatic frequency controller (AFC) 111; and a symbol timing recovery unit 112.

The quadrature demodulation receiver receives signals through an antenna, an RF unit, and an IF unit (not illustrated), and provides them to a quadrature converter (not illustrated) to generate complex signals (receiving signals). The first complex multiplier 101 corrects carrier frequency offset by control of the AFC 111, and the second complex multiplier 102 controls the input signal's gain with the AGC 108.

The above-generated signals are provided to the A/D converter 103 so as to be converted to digital signals.

The A/D converted signals are provided to the matched filter 104 and then to the I-Q imbalance corrector 105. The A/D converter 103 receives a control signal from the symbol timing recovery unit 112, and determines a sampling position of the A/D converter 103.

The signals output from the I-Q imbalance corrector 105 are recovered to signal carrier through the carrier phase detector 106 and the carrier phase recovery unit 109.

The decision unit 107 receives the recovered signals and determines signals to extract symbol values. The I-Q imbalance detector 110 detects the amplitude and phase imbalances using the recovered signals, and the I-Q imbalance corrector 105 corrects the imbalances according to detection results.

Figure 2:
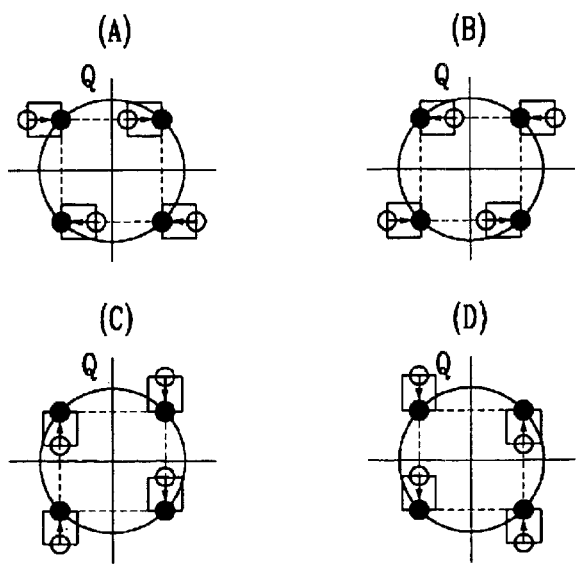
FIG. 2 shows an I-Q constellation diagram for displaying the amplitude and phase imbalances between I and Q components.

FIG. 2 shows an exemplary I-Q constellation after signal recovery when imbalances exist between I and Q components. In this instance, the black dots represent desired positions of recovered signals, and the white dots indicate the signals caused by the imbalances between I and a components.

FIGS. 2(a) and 2(b) show the phase imbalances of the Q components with respect to the I components, and FIGS. 2(c) and 2(d) represent the phase imbalances of the I components with respect to the Q components.

Figure 3:
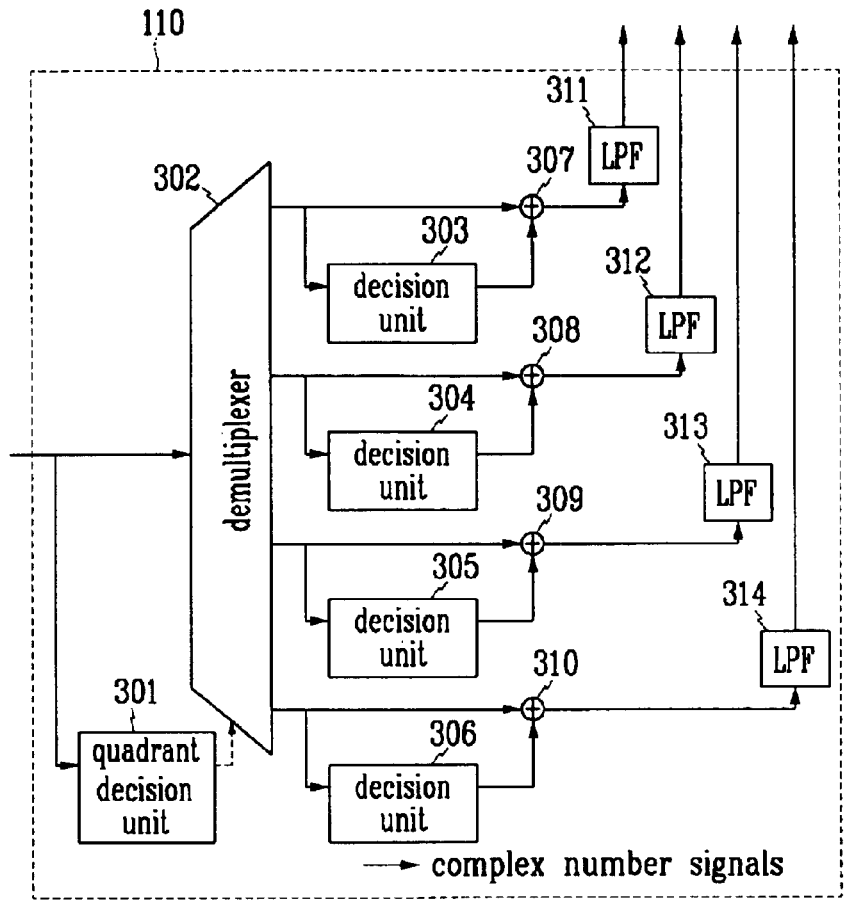
FIG. 3 shows a detailed block diagram of an I-Q imbalance detector in the quadrature demodulation receiver of FIG. 1.

FIG. 3 shows a detailed block diagram of the I-Q imbalance detector 110 in the quadrature demodulation receiver of FIG. 1.

As shown, the I-Q imbalance detector 110 comprises: a quadrant decision unit 301; a demultiplexer 302; signal decision units 303, 304, 305, and 306; subtractors 307, 308, 309, and 310; and low pass filters (LPFs) 311, 312, 313, and 314.

The quadrant decision unit 301 uses the carrier phase detector 106 of FIG. 1 and the carrier phase recovery unit 109 of FIG. 1 to determine a quadrant of the recovered carrier that is concurrently input to the demultiplexer 302 and determined into the respective quadrants.

The signals determined into the respective quadrants are input to the signal decision units 303, 304, 305, and 306 to be determined. The signals decided into the respective quadrants and the determined signals are input to the subtractors 307, 308, 309, and 310 so as to subtract the determined signals from the decided signals.

The subtracted signals are input to the respective LPFs 311, 312, 313, and 314 to be averaged. Table 1 represents output values from the quadrant decision unit.

TABLE 1

| I | Q | SEL |
|---|---|---|
| I > 0 | Q > 0 | 00 |
| I < 0 | Q > 0 | 01 |
| I > 0 | Q < 0 | 10 |
| I < 0 | Q < 0 | 11 |

As shown in FIG. 2, the LPFed signals are used for detecting imbalance states between I and Q components in the respective quadrants. The detected imbalance states are used for correcting the imbalances at the I-Q imbalance corrector of FIG. 4.

Figure 4:
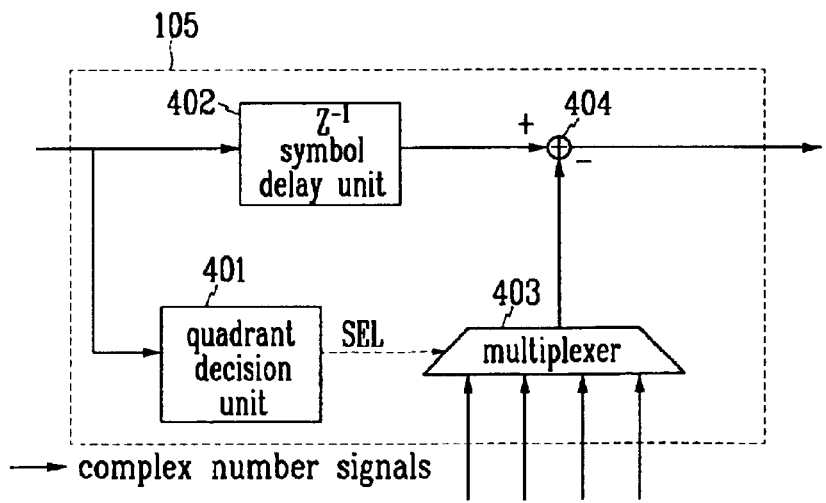
FIG. 4 shows a detailed block diagram of an I-Q imbalance corrector in the quadrature demodulation receiver of FIG. 1.

FIG. 4 shows a detailed block diagram of an I-Q imbalance corrector in the quadrature demodulation receiver of FIG. 1.

As shown, the I-Q imbalance corrector comprises: a quadrant decision unit 401; one symbol delay unit 402; a multiplexer 403; and a subtractor 404.

The quadrant decision unit 401 determines the quadrant position of the complex signal output from the matched filter 104 of FIG. 1. Concurrently, the complex signal is input to the symbol delay unit 402 to be delayed by one symbol.

The signal SEL, which controls the multiplexer output, is input to the multiplexer 403; and the signals averaged through the respective LPFs in the I-Q imbalance detector 110 of FIG. 3 are concurrently input to the multiplexer 403, and output signals are determined according to determination results of the quadrant positions.

The signal delayed by one symbol by the symbol delay unit 402 is input to the subtractor 404, and a subtracted symbol is output according to a signal input from the multiplexer 403.

The present invention enables detection of the imbalances between the I and Q components generated in the quadrature demodulator and correction thereof, thereby preventing distortion of the demodulator's performance caused by the imbalances between I and Q components.

Also, differing from the conventional I and 0 imbalance correctors, the present invention uses LPFs for detecting complex signals and removing noise of the detected signals to reduce noise effects, and corrects the imbalances between I and Q components without detecting the phase imbalances between I and Q components, thereby increasing application to high-speed wireless communication.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for detecting and correcting amplitude and phase imbalances between in-phase (I) and quadrature-phase (Q) components in a high-speed wireless communication quadrature demodulator, comprising:

a) comparing an input signal with a signal determined by a quadrant to which the input signal belongs, and detecting imbalances between I and Q components with respect to the input signal; and b) using the imbalances detected in a) to correct the input signal, wherein a) comprises:

1) determining a quadrant position of the input signal;

2) using the quadrant position determined in 1) to determine the input signal with respect to respective quadrants;

3) respectively determining the signals determined with respect to respective quadrants in 2);

4) subtracting the determined signals in 3) from the determined signals in 2); and 5) averaging the respective subtracted signals to output the amplitude and phase imbalances between I and Q components.

2. A method for detecting and correcting amplitude and phase imbalances between in-phase (I) and quadrature-phase (Q) components in a high-speed wireless communication quadrature demodulator comprising:

a) comparing an input signal with a signal determined by a quadrant to which the input signal belongs, and detecting imbalances between I and Q components with respect to the input signal; and b) using the imbalances detected in a) to correct the input signal, wherein b) comprises:

1) delaying the input signal by one symbol;

2) determining the input signal's quadrant position;

3) determining the amplitude and phase imbalance signals between I and Q components detected with respect to the input signal according to the quadrant position determined in 2); and 4) subtracting the imbalance signals determined in 3) from the input signal delayed in 1) to correct the input signal.

3. A quadrature demodulator for high-speed wireless communication, comprising:

a multiplier for performing carrier frequency offset correction and signal magnitude correction on signals received through an antenna;

an amplitude and phase imbalance corrector for correcting the amplitude and phase imbalances of the signals output from the multiplier, and outputting them;

a carrier phase detector for detecting a phase of the carrier from the signals output from the amplitude and phase imbalance corrector;

an amplitude and phase imbalance detector for comparing the signals output from the carrier phase detector with the signals determined by the quadrant to which the signals belong, detecting the amplitude and phase imbalances of the signals between I and Q components, and outputting them to the amplitude and phase imbalance corrector; and a symbol decision unit for extracting symbol values from the signals output from the carrier phase detector, and outputting them, wherein the amplitude and phase imbalance corrector comprises:

a signal delay unit for delaying the signal input from the multiplier by one symbol;

a quadrant decision unit for determining a position of the quadrant corresponding to the input signal;

a multiplexer for comparing the input signal with the signal determined by the quadrant to which the input signal belongs, matching the amplitude and phase imbalance of the detected input signal between the I and Q components with the quadrant position determined by the quadrant decision unit, and outputting results; and a subtractor for subtracting the signal output from the multiplexer from the signal output from the signal delay unit, and outputting results.

4. A quadrature demodulator for high-speed wireless communication comprising:

a multiplier for performing carrier frequency offset correction and signal magnitude correction on signals received through an antenna;

an amplitude and phase imbalance corrector for correcting the amplitude and phase imbalances of the signals output from the multiplier, and outputting them;

a carrier phase detector for detecting a phase of the carrier from the signals output from the amplitude and phase imbalance corrector;

an amplitude and phase imbalance detector for comparing the signals output from the carrier phase detector with the signals determined by the quadrant to which the signals belong, detecting the amplitude and phase imbalances of the signals between I and Q components, and outputting them to the amplitude and phase imbalance corrector; and a symbol decision unit for extracting symbol values from the signals output from the carrier phase detector, and outputting them, wherein the amplitude and phase imbalance detector comprises:

a quadrant decision unit for receiving an input signal from the carrier phase detector and outputting a corresponding quadrant position;

a demultiplexer for outputting the input signal to be matched with the quadrant position output by the quadrant decision unit;

a signal decision unit for outputting a signal determined with respect to the quadrant corresponding to the signal output from the demultiplexer;

a subtractor for subtracting the signal output from the signal decision unit from the signal output from the demultiplexer, and outputting results; and a signal averager for averaging the signals output from the subtractor, and outputting results.

5. A quadrature demodulator for high-speed wireless communication, comprising:

a multiplier for performing carrier frequency offset correction and signal magnitude correction on signals received through an antenna;

an amplitude and phase imbalance corrector for correcting the amplitude and phase imbalances of the signals output from the multiplier, and outputting them;

a carrier phase detector for detecting a phase of the carrier from the signals output from the amplitude and phase imbalance corrector;

an amplitude and phase imbalance detector for comparing the signals output from the carrier phase detector with the signals determined by the quadrant to which the signals belong, detecting the amplitude and phase imbalances of the signals between I and Q components, and outputting them to the amplitude and phase imbalance corrector; and a symbol decision unit for extracting symbol values from the signals output from the carrier phase detector, and outputting them, wherein the signal averager is a low pass filter for filtering low frequency ranges of the signal output from the subtractor, and outputting results.

* * * * *